(12) United States Patent
Pompa et al.

(10) Patent No.: US 6,446,491 B1
(45) Date of Patent: Sep. 10, 2002

(54) METHOD AND APPARATUS FOR LOCATING LEAKS IN PIPELINES

(76) Inventors: Juan Rogelio Pompa, P.O. Box 807, South Houston, TX (US) 77587; Jerry M. Ball, P.O. Box 807, South Houston, TX (US) 77587

( * ) Notice: Subject to any disclaimer, the term of this patent is extended or adjusted under 35 U.S.C. 154(b) by 0 days.

(21) Appl. No.: 09/746,622

(22) Filed: Dec. 22, 2000

(51) Int. Cl.[7] ................................................ G01M 3/08
(52) U.S. Cl. .................................................. 73/40.5 R
(58) Field of Search ........................... 73/40, 40.5 R, 73/49.2, 49.5; 702/51

(56) References Cited

U.S. PATENT DOCUMENTS

| | | | | |
|---|---|---|---|---|
| 1,985,348 A | * | 12/1934 | Henneberger | 137/77 |
| 2,071,698 A | * | 2/1937 | Mample | 137/77 |
| 2,427,627 A | * | 9/1947 | Shiroyan | 174/11 |
| 3,664,357 A | * | 5/1972 | Kreiss | 137/2 |
| 3,667,285 A | * | 6/1972 | Wright et al. | 73/40.5 R |
| 3,793,876 A | * | 2/1974 | Oswald | 73/46 |
| 3,987,662 A | * | 10/1976 | Hara et al. | 73/40.5 R |
| 4,306,446 A | * | 12/1981 | Fukuda | 73/40.5 R |
| 4,796,466 A | * | 1/1989 | Farmer | 73/40.5 R |
| 5,272,646 A | * | 12/1993 | Farmer | 364/509 |
| 5,279,147 A | * | 1/1994 | Bertini et al. | 73/40 |
| 5,343,737 A | * | 9/1994 | Baumoel | 73/40.5 R |
| 5,438,862 A | * | 8/1995 | Keating et al. | 73/49.2 |

* cited by examiner

*Primary Examiner*—Hezron Williams
*Assistant Examiner*—Charles D. Garber
(74) *Attorney, Agent, or Firm*—Bill B. Berryhill

(57) ABSTRACT

A method and apparatus for locating leaks at an undetermined location in a section of pipeline of known length. Standard pressure vessels of relatively small volume are connected to respective ends of the pipeline section through valves. The pipeline is closed at each end and the valves into the standard pressure vessels are opened. Fluids are placed in the pipeline under a pressure. The valves to both of the standard pressure vessels are simultaneously closed, isolating each of the standard pressure vessels from the pipeline section so as to maintain the pressure vessels at substantially the same level as at the time of closing. The differential pressure between each end of the pipeline and its respective standard pressure vessel is then continuously monitored and recorded in real time measurements. The location a leak is determined by solving an equation, based on the equilibrium equation and real time measured differerential pressure values at each end of the pipeline.

13 Claims, 2 Drawing Sheets

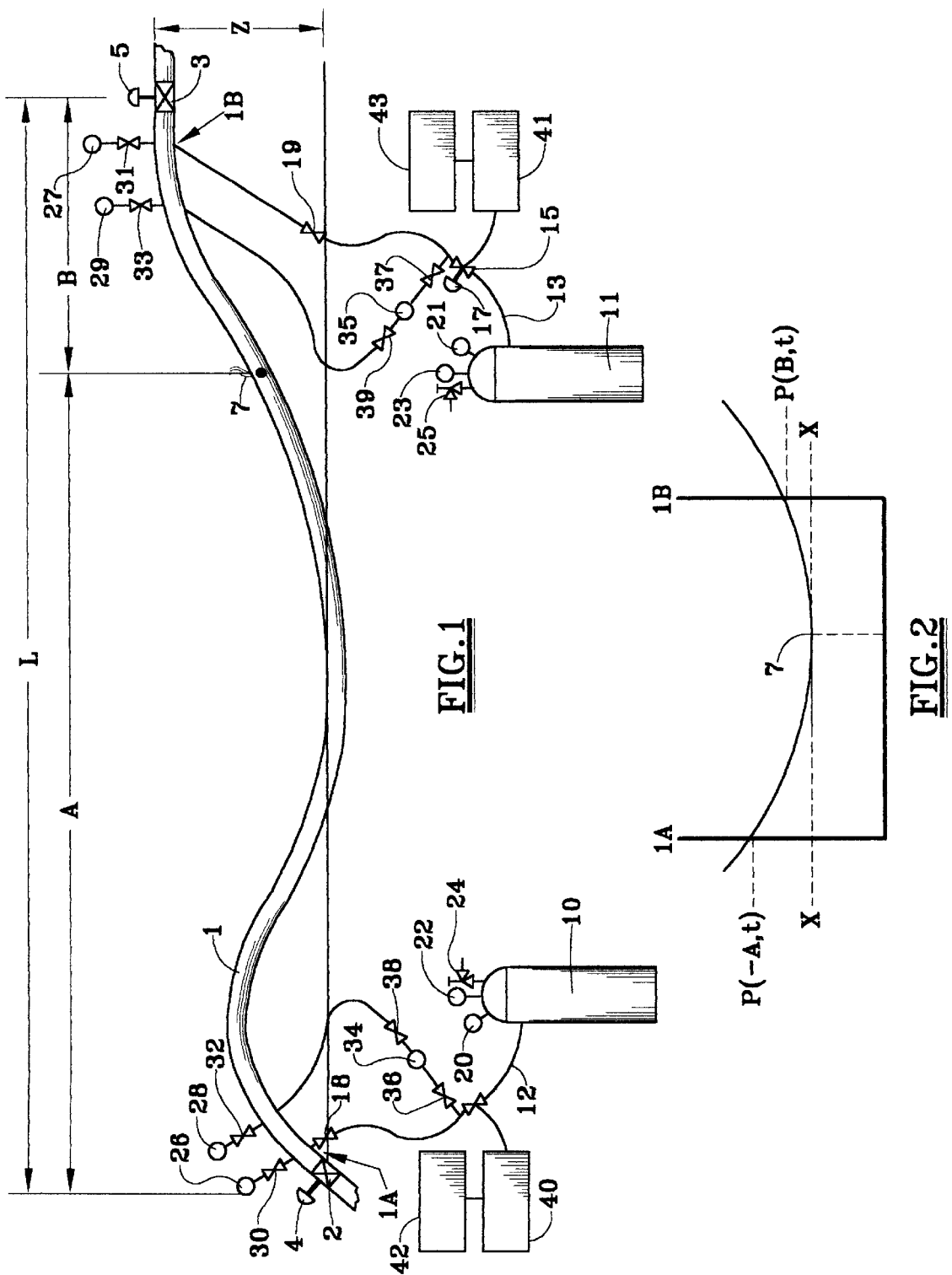

ature 20, 21 and pressure 22, 23 measuring instruments and safety relief valves 24, 25, respectively. Differential pressure measuring devices 34,35 and associated valves 36, 38 and 37, 39 connect conduits 12, 13 to respective ends 1A, 1B of the pipeline section and are for measuring the differential pressure between the ends 1A, 1B of the pipeline section and their respective standard pressure vessels 10, 11.

METHOD AND APPARATUS FOR LOCATING LEAKS IN PIPELINES

BACKGROUND OF THE INVENTION

1. Field of the Invention

The present invention pertains to methods and apparatus for locating leaks in pipelines. More specifically, the present invention pertains to methods and apparatus for locating small fluid leaks at undetermined locations in a pipeline, especially those of a magnitude not easily detected by other methods.

2. Brief Description of the Prior Art

Increased awareness of environmental, safety and financial consequences of petroleum and petroleum products leaking from pipelines has heightened the demand for accurate methods and apparatus for detecting and determining the location of pipeline leaks. Most pipelines are buried in the ground and, unless the leak is large enough to be visible from the surface of the ground or the air, may not be easily detected. This is especially true for very small leaks. Although small leaks may not be as hazardous as large ones, environmental, safety and financial consequences are still of great importance.

The typical method for determining if there is a leak in a pipeline is hydrostatic testing where fluids, such as water, are placed in the section of pipeline under observation. The pipeline section is closed at both ends and the fluids are pressurized therein. Pressure and temperature measuring devices are monitored over the next several hours to indicate whether there is a leak or not. However, even though declining pressure may indicate a leak, a leak may be so small as not to be readily located.

A number of pressure, volume and flow measuring techniques have been developed for determining and locating leaks in pipelines. However, none of them appear to be totally effective in accurately locating very small pipeline leaks. The industry continues to search for more effective and efficient methods and apparatus for doing so.

SUMMARY OF THE PRESENT INVENTION

The present invention provides a method and apparatus for locating leaks at an undetermined location in a section of pipeline of known length. A standard pressure vessel of relatively small volume is provided at each end of the pipeline section and connected to respective ends of the pipeline section through a valve. The section of pipeline is closed at each end and the valves into the standard pressure vessels are opened. Fluids, whether they be water or other fluids, are placed in the pipeline and the standard pressure vessels under a pressure of at least a predetermined level. Then the valves to both of the standard pressure vessels are simultaneously closed, isolating each of the standard pressure vessels from the pipeline section so as to maintain the pressure vessels at substantially the same level as at the time of closing. The differential pressure between each end of the pipeline and its respective standard pressure vessel is then continuously monitored and recorded in real time measurements and, if there is a leak, the location of the leak is determined by solving an equation, based on the equilibrium equation and real time measured differential pressure values at each end of the pipeline.

Apparatus for performing the method of the present invention includes, in addition to the standard pressure vessels and associated valves at each end of the pipeline, differential pressure measuring means at each end of the pipeline and means for continuously monitoring and recording the differential pressures. In a preferred embodiment, the apparatus includes a computer which is programmed to solve an equation for determining the distance of a leak from one end of the pipeline section by utilizing the real time measured differential pressures. Preferred embodiments also include transmitters operatively connected to the differential pressure means at each end of the pipeline and a receiver remotely located with and connected to the computer to effect simultaneous real time input from the differential pressure means at both ends of the pipeline section for processing by the computer.

With the method and apparatus of the present invention, the location of a leak can be accurately determined within a relatively short period of time. The apparatus for performing the method requires accurate instruments. However such instruments are readily available with today's technology. The components of the apparatus are simply configured, installed and operated. Other objects and advantages of the invention will be apparent from reading the description which follows in conjunction with the accompanying drawings.

BRIEF DESCRIPTION OF THE DRAWINGS

FIG. 1 is a drawing schematically representing a pipeline section having a leak therein and illustrating apparatus of the present invention used in determining the location of the leak;

FIG. 2 is a graph representing fluid pressure in the pipeline at various locations.

DESCRIPTION OF A PREFERRED EMBODIMENT OF THE INVENTION

Figure 3:
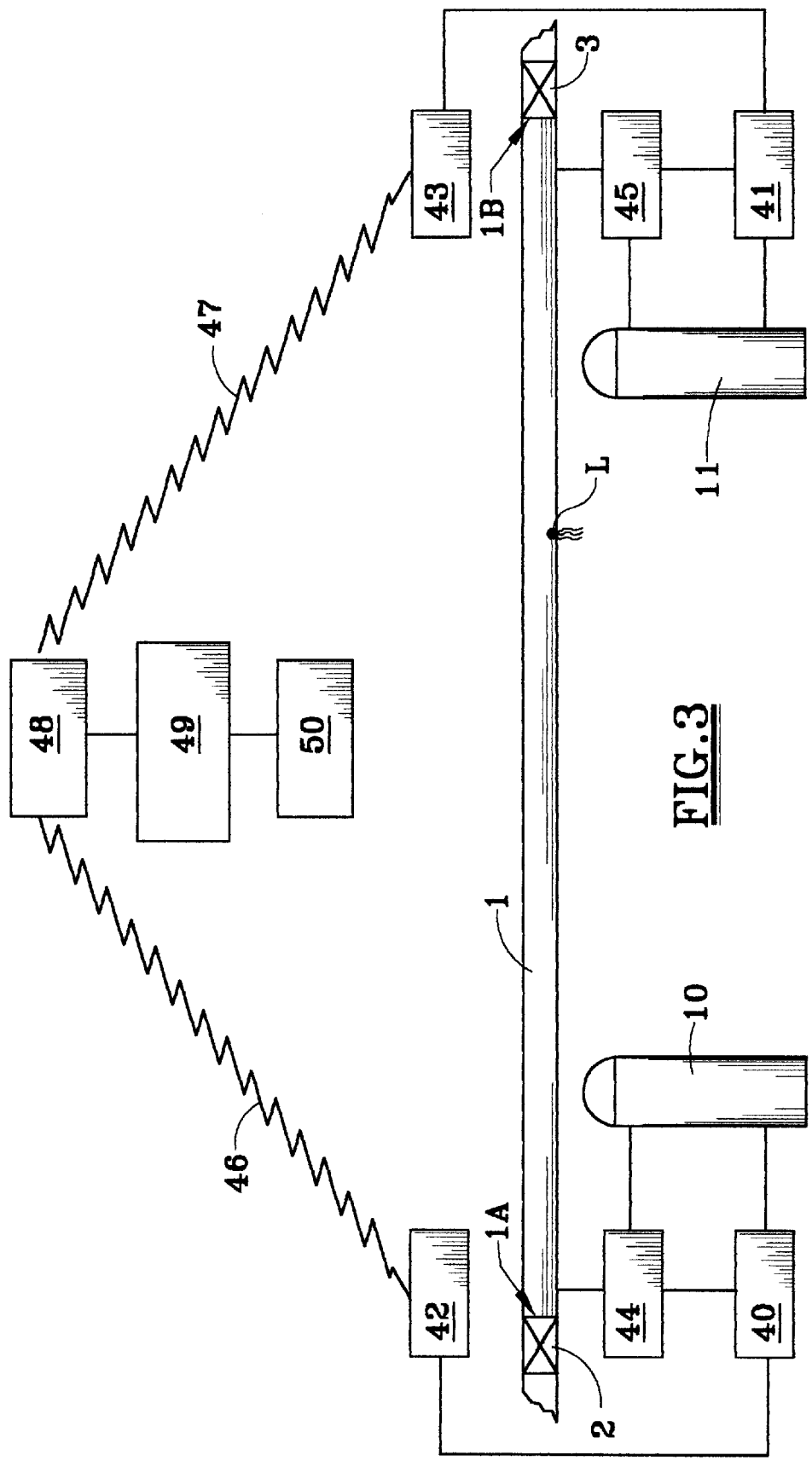
FIG. 3 is a schematic representation of apparatus utilized in the method of the present invention.

Referring first to FIG. 1, there is represented a section of pipeline 1 which may be closed at opposite ends 1A, 1B thereof by valves 2 and 3. These valves may be provided with operators 4 and for closing and opening thereof. There is a leak of small magnitude located at 7. The length L of the pipeline section 1 is known. The length or distance between one end 1A of the pipeline section 1 and the leak 7 is not initially known but will be represented as A. Obviously the length B from the opposite end 1B of the pipeline section 1 to the leak 7 is not known either. The elevation of the pipeline will vary from one end to the other. For purposes of illustration, the elevation of the pipeline and the valve 2 at end 1A will be a 0 datum point and the elevation of the pipeline at the valve 3 and end 1B is represented by Z.

Provided at each end of the pipeline are first and second "standard" pressure vessels 10 and 11 of relatively small volume. These special vessels 10, 11 may take the form of insulated metal cylinders. Each of the standard pressure vessels 10, 11 are connected in fluid communication with a respective end of the pipeline section 1 through conduits 12, 13 and valves 14, 15. The valves 14 and 15 may also be provided with operators 16 and 17. In addition, cut-off valves 18 and 19 may be provided in the conduits 12 and 13. The pressure vessels 10, 11 may be provided with temperature 20, 21 and pressure 22, 23 measuring instruments and safety relief valves 24, 25, respectively. Differential pressure measuring devices 34,35 and associated valves 36, 38 and 37, 39 connect conduits 12, 13 to respective ends 1A, 1B of the pipeline section and are for measuring the differential pressure between the ends 1A, 1B of the pipeline section and their respective standard pressure vessels 10, 11.

Each end 1A, 1B of the pipeline section may also be provided with temperature 26, 27 and pressure 28, 29 measuring devices. Valves 30, 31, 32, 33 may be provided to allow changing or repair of the measuring device 26–29.

Each end 1A, 1B of the pipeline section 1 is provided with a reader/controller 40, 41 for reading temperature, pressure and differential pressures measured by the measuring devices 20, 22, 26, 28 and 34 at end 1A and 21, 23, 27, 29 and 35 at end 1B and feeding these values to a transmitter 42, 43 for transmission to a remote location. The reader/controllers 40, 41 are also operatively connected to valves and operators 14, 16 and 15, 17 to control opening and closing of the valves 14, 15 upon receiving a signal to do so. The reader/controllers 40, 41 could also be operatively connected to other valves and operators such as 2, 4 and 3, 5 for remote operations thereof, if desired.

FIG. 3 is a schematic representation, in block form, which further illustrates the method and apparatus of the present invention. The pipeline section 1 is shown, its ends 1A and 1B being at valves 2 and 3. The standard pressure vessels 10 and 11 are shown and all of the measuring devices of FIG. 1 are represented by blocks 44, 45. The reader/controllers 40, 41 and transmitters 42, 43 of FIG. 1 are also represented in FIG. 3.

Also shown and represented in FIG. 3 is a receiver 48 which may be located at a remote location. Reading from the measuring devices represented at 44 and 45 are fed to the reader/controllers 40, 41 and to the transmitters 42, 43 for remote transmission via signals 46, 47 to the receiver 48. The receiver 48 is operatively connected to a computer processor 49 which processes the information received, solving an equation to determine the distance A or B to locate the leak 7 in the pipeline section 1. A recorder/printer 50 may be connected to the computer processor 49 for recording various measurements and for visually displaying the results of computer calculations.

The computer processor solves an equation:

$$DP(-A, t_1)/DP(B, t_1) = \cos h(A)/\cos h(L-A)$$

where:
- $DP(-A, t_1)$ = differential pressure between one end 1A of the pipeline section and standard pressure vessel 10 at time $t_1$;
- $DP(B, t_1)$ = differential pressure between the other end 1B of the pipeline section and standard pressure vessel 11 at time $t_1$;
- L = known length of pipeline section 1;
- A = the distance between one end 1A of the pipeline section and the location of the leak 7; and
- B = the distance between the opposite end 1B of the pipeline section and the location of the leak 7.

With this equation the leak 7 may be accurately located. The derivation of this equation and the proof thereof, follows.

The magnitude of the flow velocity in a pipeline from a small leak, is nil. The kinetic energy of the flow is essentially zero; therefore, conventional hydraulic methods are not suitable for finding very small leaks.

When a pipeline is pressurized, the pipeline and its medium are compressed (strained and stressed). A great deal of elastic strain energy is stored in the pipe. Strained compressive energy is also stored in the medium itself (fluid or gas), including thermal energy. By suddenly opening a valve in a pipeline, this stored energy is released to produce water-hammer. The stored (potential) energy is then converted to kinetic energy and then back to potential energy, surging several times to produce a devastating and destructive effect on the pipeline.

When a small leak occurs in the pipeline the compressed energy is released slowly. The method of locating the leak of the present invention is based on the relatively slow release of this stored energy. By obtaining and recording very precise pressure drop readings at recorded time intervals, the constants of the equation which describe the internal pressure of the fluid or gas contained in the pipeline as it varies with both distance along the pipe and with time can be experimentally determined. By obtaining the pressure variation equation, all the energies and deformations of the pipeline and its medium can be determined, including the magnitude of the leak rate.

The internal pressure equation utilized in the present invention is derived from the general equilibrium equation which is applicable for any medium, be it a solid elastic medium such as the pipe itself or its internal medium, the fluid or gas that it contains.

The Equilibrium Equation $$\nabla \cdot \sigma + \rho f = \rho \partial^2 u / \partial t^2 \qquad \text{Equation No. 1}$$

$[M/L^2T^2]$

Definitions
[M]=Mass [L]=Length [T]=Time
σ a Stress tensor of the medium
ρ Mass density of the medium
u Displacement vector
ρf Force density vector (due to acceleration or gravity field)
t Time For a perfect fluid or gas the stress tensor is equal to:

$$\sigma = -PI \qquad \text{Equation No. 2}$$

where P is equal to pressure and I is the unity tensor.
Pressure is equal to:

$$P = -B(\nabla \cdot u) \qquad \text{Equation No. 3}$$

where B is the bulk modulus of the fluid or gas and $\nabla \cdot u$ is the divergence of the displacement field.

Substituting Equation No. 2 in Equation No. 1 we get:

$$-\nabla P + \rho f = \rho \partial^2 u / \partial t^2 \qquad \text{Equation No. 4}$$

Taking the divergence of Equation No. 4, $$\nabla \cdot [-\nabla P + \rho f = \rho \partial^2 u / \partial t^2] - \nabla^2 P + \nabla \cdot (\rho f) = \rho \partial^2 (\nabla \cdot u) / \partial t^2 = \rho \partial^2 (-P/B) / \partial t^2 B/\rho = \alpha^2 \qquad \text{Equation No. 5}$$

where α equals the speed of sound in the medium.

If $\nabla \cdot (\rho f) = 0$, which is the case for a gravity field near the surface of the earth, we are left with the equation:

$$\nabla^2 P = (1/\alpha^2) \partial^2 P / \partial t^2 \qquad \text{Equation No. 6}$$

In cylindrical coordinates, this is:

$$\partial^2 P/\partial r^2 + (1/r)\partial P/\partial r + (1/r^2)\partial^2 P/\partial \theta^2 + \partial^2 P/\partial z^2 = \rho \partial^2 P/\partial t^2$$

Since the Pressure in the fluid or gas in the pipeline does not vary in this case, in the radial (r) or circular (θ) direction, the pressure is a function of time (t) and of distance (z) only. Placing the z coordinate along the center line of the pipeline:

$$\partial^2 P/\partial z^2 = \rho \partial^2 P/\partial t^2 \qquad \text{Equation No. 7}$$

$P = P(z, t)$

Letting the pressure function be the product of two functions, distance Z and time T(times a constant), $P = Z \cdot T$, and substituting into Equation No. 6

$$T \cdot (\partial^2 Z/\partial z^2) = (1/\alpha^2) \cdot Z \cdot (\partial^2 T/\partial t^2)$$

Separating variables by dividing both sides by $(Z \cdot T)$ $$(1/Z) \cdot \partial^2 Z/\partial z^2 = [1/(\alpha \cdot T)] \cdot \partial^2 T/t^2 = \pm \lambda^2$$

is a constant. If the sign in front of $\lambda^2$ is negative (−) we have the familiar wave equation, which would apply to water hammer (pressure waves) and sound wave conditions. However, when the sign in front on $\lambda^2$ is positive (+) the equation describes a decaying function.

The Z general function of distance is equal to:

$$Z + C_1 \exp(\lambda z) + C_2 \exp(-\lambda z)$$

(note: $\exp(\lambda z) = c^{\lambda z}$)

The T general function of time is equal to:

$$T = C_3 \exp(\lambda \alpha t) + C_4 \exp(\lambda \alpha t)$$

Equation No. 4 requires the consideration of pressure variation along the pipeline due to the earth's gravity field. This pressure variation is constant with time but varies linearly with distance due to elevation changes. Finally, there is pressure constant required to account for atmospheric pressure. For example, if the pipeline were perfectly level and the leak were to occur on top of a pipeline full of liquid, only a small amount of the liquid would spill out. The pressure of the pipeline would drop only to atmospheric pressure and the pipeline would remain virtually full.

The complete general pressure equation, therefore, is:

$$P(z,t) = (C_1 \exp(\lambda z) + C_2 \exp(-\lambda z)) \cdot (C_3 \exp(\lambda \alpha t) + C_4 \exp(-\lambda \alpha t)) + C_5 z + P_{atm} \qquad \text{Equation No. 8}$$

Now, we must look at the physics of the problem to determine the boundary conditions. First, after a leak occurs, the internal pressure decreases with time, it does not increase. Therefore, constant $C_3$ must equal to zero and $C_4$ is non-zero. Second, if the pipeline were perfectly level where elevation were not a consideration, we know that the lowest pressure in the pipeline will occur at the leak, at any and all times. Another way of saying this is that pressure is at a minimum at the leak at all times.

Mathematically, minimum pressure means that:

$$\partial P(z,t)/\partial z = 0 \text{ at the leak.}$$

$$\partial P(z,t)/\partial z = [C_1 \lambda \exp(\lambda z) - C_2 \lambda \exp(-\lambda z)] \cdot (C_4 \exp(-\lambda \alpha t))$$

For $z=0$ at the leak $$\partial P(z,t)/\partial z = [C_1 \lambda - C_2 \lambda] \cdot (C_4 \exp(-\lambda \alpha t)) = 0$$

For $[C_1 \lambda - C_2 \lambda]$ to be equal to zero, $C_1$ must be equal to $C_2$.

The final working general pressure equation we are left with then is:

$$P(z,t) = (C_1 [\exp(\lambda z) + \exp(-\lambda z)] \cdot C_4 \exp(-\lambda \alpha t) + C_5 z + P_{atm}. \qquad \text{Equation No. 9.}$$

Before detailing the method for mathematically locating a pipeline leak using Equation No. 9 accuracy of the pressure reading should be discussed. As valuable and essential as equation No. 9 is, it is only as accurate as the variables used in the equation. The key variables in Equation No. 9 are pressure and time.

The electronic clocks of computers for logging the data are highly accurate. At this time there is no need to get any more accurate. The accuracy of the pressure readings is another case. Present state-of-the-art electronic instrumentation is usually +/−0.5% inaccuracy over the range of the operation. For example, if the hydrostatic test pressure of a pipeline is 950 psig, and a test pressure gauge of 1200 psig range is used, the accuracy of the gauge is: 1200 psig×0.5/100=+/−6.0 psig.

It is obvious (from uncertainty analysis of the equation) that very accurate pressure readings are needed. Toward this goal, the "standard" pressure vessels 10, 11 illustrated in FIG. 1, a device for taking accurate pressure reading in inches of water was built, experimentally tested and developed.

In order to increase accuracy of pressure readings, differential pressures measured in inches of water are taken relative to a fixed "standard" pressure. At each end 1A, 1B of the pipeline, a standard pressure vessel 10, 11 is connected to the pipeline, via a short high pressure conduit with an in line valve. The pressure of the vessels 10, 11 and pipeline section 1 increase simultaneously as the pressure is increased. The gauge pressure, differential pressure and temperature are electronically automatically and continuously monitored by instrumentation (44, 45 in FIG. 3) and transmitted via remote communication from both ends of the pipeline to a central computer 49 and permanently recorded. When the pipeline reaches a predetermined pressure level, the pumps are shut off. As the pressure in the whole pipeline section 1 starts to drop, the valves 14, 15 to the standard vessels (10, 11) at both ends 1A, 1B are simultaneously closed via an electronic signal. By closing the valves 14, 15, the pressures at the ends of the pipeline section are "locked in". The times are also accurately recorded. From these pressures, very accurate and small differential pressure readings (in inches of water) are taken and recorded along with their times. The differential pressure range is 150 inches, therefore the +/−0.5% inaccuracy for the range is 0.75 in. water (0.0271 psig). The pressure reading is 221.5 times (6/.0271) more accurate.

The location of the leak will now be shown using Equation No. 9 which is here repeated:

$$P(z,t) = C_1 [\exp(\lambda z) + \exp(-\lambda z)] \cdot C_4 \exp(-\lambda \alpha t) + C_5 z + P_{atm}.$$

Let us chose the origin of the coordinate system to be at the leak 7. See FIG. 2. It will make the math simpler, although it really doesn't matter where the origin is chosen. Two data stations are located at 1A and 1B distances A and B from the leak 7. Since point 1A is located to the left of the origin 7 on the x number line, it is considered negative.

After the pumping stops and the pressure of the pipeline section starts to drop, due to the leak, the pressure in each standard pressure vessel 10, 11 at each location 1A, 1B is locked in. Many differential pressure readings and their times are recorded. Any of these readings can be chosen to be the datum zero time, although the earlier the better, since more readings can be compared.

At zero datum time, at Station 1A the pressure is: First, let $C_1 \cdot C_2 = C_6$, then $$P(-A,0) = C_6 [\exp(\lambda(-A)) + \exp(-\lambda(-A))] \cdot \exp(-\lambda \alpha(0)) + C_5(-A) + P_{atm}$$

$$P(-A,0) = C_6 [\exp(\lambda(-A)) + \exp(-\lambda(-A))] + C_5(-A) + P_{atm} \qquad \text{Equation No. 10.}$$

At a later time $t_1$, a differential pressure reading $DP(-A,t_1)$ is taken between the pipeline and the "standard". Therefore, at later time $t_1$, at station 1A the pressure is:

$$P(-A,0) - DP(-A,t_1) = C_6 [\exp(\lambda(-A)) + \exp(-\lambda(-A))] \cdot \exp(-\lambda \alpha(t_1)) + C_5(-A) + P_{atm} \qquad \text{Equation No. 11}$$

By subtracting Eq. No. 11 from Eq. No. 10, we have:

$$DP(-A,t_1)=C_6[\exp(\lambda(-A))+\exp(-\lambda(-A))]\cdot[1-\exp(-\lambda\alpha t_1)]$$ Equation No. 12.

Doing the same thing for another differential pressure reading at another time interval $t_2$ we get:

$$DP(-A,t_2)=C_6[\exp(\lambda(-A))+\exp(-\lambda(-A))]\cdot[1-\exp(-\lambda\alpha t_2)]$$ Equation No. 13.

Dividing Eq. No. 12 by Eq. No. 13 we finally get:

$$DP(-A,t_1)/DP(-A,t_2)=[1-\exp(-\lambda\alpha t_1)]/[1-\exp(-\lambda\alpha t_2)]$$ Equation No. 14

$\alpha$ is the speed of sound in water and can be experimentally determined from the temperature readings taken. Therefore, from Eq. No. 14, $\lambda$ can be mathematically determined. $\lambda$ is a characteristic of the pipeline and could just as easily have been determined at Station 1B. In fact, it should also be determined at Station 1B, and compared for accuracy.

After $\lambda$ has been determined, differential pressures taken at the same time, at each Station 1A & 1B need to be compared. Using Eq. No. 12 at each station we have:

$$DP(-A,t_1)=C_6[\exp(\lambda(-A))+\exp(-\lambda(-A))]\cdot[1-\exp(-\lambda\alpha t_1)]$$ Equation No. 12

$$DP(-B,t_1)=C_6[\exp(\lambda(-B))+\exp(-\lambda(-B))]\cdot[1-\exp(-\lambda\alpha t_1)]$$ Equation No. 15

Dividing Eq. No. 12 by Eq. no 15 we then have:

$$DP(-A,t_1)/DP(B,t_1)=[\exp(\lambda(-A))+\exp(-\lambda(-A))]/[\exp(\lambda(-B))+\exp(-\lambda(-B))]$$ Equation No. 16

Noting that: $\cos h(\lambda(A))=[\exp(\lambda(-A))+\exp(-\lambda(-A))]$, Equation No. 16 is then:

$$DP(-A,t_1)/DP(B,t_1)=\cos h(A)/\cos h(B)$$ Equation No. 17

L is the total length of the pipeline, and must be known. A+B=L. Substituting L−A for B in Eq. No. 17 we get:

$$DP(-A,t_1)/DP(B,t_1)=\cos h(A)/\cos h(L-A)$$ Equation No. 18

From Eq. 18, A can be mathematically determined. A is the distance from Station 1A to the leak 7. For different readings the same value for A should be determined each time. For accuracy, all the different values determined for A should be averaged to get a more accurate location of the leak.

With the method and apparatus of the present invention, leaks of small magnitude can be accurately located and repaired in a relatively short period of time and at reasonable cost. This may result in substantial environmental, safety and financial rewards.

Although a preferred method and apparatus therefor are disclosed herein, many variations may be made by those skilled in the art without departing from the spirit of the invention. Accordingly, it is intended that the scope of the invention be limited only by the claims which follow.

What is claimed is:

1. A method of locating leaks at an undetermined location in a section of pipeline of known length comprising the steps of:

provinding at each end of said section of pipeline a standard pressure vessel of relatively small volume;

connecting each of said standard pressure vessels to a respective end of said pipeline section through a respective valve;

closing each end of said section of pipeline and opening said valves into said standard pressure vessels;

assuring that fluids in said section of pipeline and in said standard pressure vessels are under a pressure of at least a predetermined level;

simultaneously closing each of said standard pressure vessel valves isolating each of said standard pressure vessels from said section of pipeline;

continuously monitoring and recording, in real time measurements, the differential pressure between each end of said pipeline and its respective standard pressure vessel; and determining the location of said leak by solving the following equation:

$$DP(-A,t_1)/DP(B,t_1)=\cos h(A)/\cos h(L-A)$$

where $DP(-A,t_1)$=differential pressure between one end of said pipeline section and its respective standard pressure vessel at time $t_1$, a time later than a selected zero datum time;

$DP(B,t_1)$=differential pressure between the opposite end of said pipeline section and its respective standard pressure vessel at time $t_1$;

L=the known length of said pipeline section; and

A=the distance between said one end of said pipeline section and the location of said leak.

2. The method of locating pipeline leaks as set forth in claim 1 in which the pressure at each end of said pipeline section is also continuously monitored during said monitoring and recording of said differential pressures between said ends of said pipeline sections and their respective standard pressure vessels.

3. The method of locating pipeline leaks as set forth in claim 2 in which the temperature at each end of said pipeline section is also continuously monitored with said pressure thereof.

4. The method of locating pipeline leaks as set forth in claim 1 in which said valves of each of said standard pressure vessels are simultaneously closed by remote signals thereto.

5. The method of locating pipeline leaks as set forth in claim 1 in which said differential pressures between said ends of said pipeline section and their respective standard pressure vessels are remotely transmitted to a processing station for said continuous monitoring and recording thereof.

6. The method of locating a pipeline leak as set forth in claim 5 in which said processing station comprises computer means which determines the distance A between said one end of said pipeline section and the location of said leak by solving the equation of claim 1.

7. The method of locating a pipeline leak as set forth in claim 1 in which the fluid in said pipeline section and said standard pressure vessels is elevated to a predetermined pressure level and stabilized prior to said simultaneous closing of said first valves.

8. The method of locating a pipeline leak as set forth in claim 1 in which said differential pressures at each end of said pipeline section are monitored and recorded a continued number of times, said equation of claim 1 being solved for each of said times and averaged to determine an average for distance A.

9. Apparatus for locating leaks at an undetermined location in a section of pipeline of known length, the ends of which may be closed after placing said pipeline under predetermined test pressure, said apparatus comprising:

a first standard pressure vessel of relatively small volume at one end of said pipeline section, a second standard pressure vessel substantially identical to said first standard pressure vessel at the opposite end of said pipeline section;

each of said first and second pressure vessels being in fluid communication with said one and said opposite ends of said pipeline section, respectively, when closed and under said predetermined test pressure, through a first conduit and valve and a second conduit and valve, respectively;

each of said first and second valves being simultaneously closeable to isolate each of said first and second standard vessels, at said predetermined test pressure, from their respective ends of said pipeline section;

first differential pressure measuring means connected to said one end of said pipeline section and said first standard pressure vessel for measuring the differential pressure therebetween;

second differential pressure means connected to said opposite end of said pipeline section and said second standard pressure vessel for measuring the differential pressure therebetween;

first and second means operably and respectively connected to said first and second differential pressure means for continuously monitoring and recording, over a period of time, said differential pressures; and computer means operably connected to said first and second means for continuously monitoring and recording said differential pressures, said computer means being programmed to solve an equation for determining the distance of said leak from said one end of said pipeline section by utilizing said differential pressures.

10. Pipeline leak locating apparatus as set forth in claim 9 in which each of said first and second valves are provided with remotely operable actuators which are responsive to electronically transmitted signals to effect said simultaneous closing thereof.

11. Apparatus for locating leaks at an undetermined location in a section of pipeline of known length, the ends of which may be closed, said apparatus comprising:

a first standard pressure vessel of relatively small volume at one end of said pipeline section, a second standard pressure vessel substantially identical to said first standard pressure vessel at the opposite end of said pipeline section;

each of said first and second pressure vessels being in fluid communication with said one and said opposite ends of said pipeline section, respectively, through a first conduit and valve and a second conduit and valve, respectively;

each of said first and second valves being simultaneously closeable to isolate each of said first and second standard vessels from their respective ends of said pipeline section;

first differential pressure measuring means connected to said one end of said pipeline section and said first standard pressure vessel for measuring the differential pressure therebetween;

second differential pressure means connected to said opposite end of said pipeline section and said second standard pressure vessel for measuring the differential pressure therebetween;

first and second means operably and respectively connected to said first and second differential pressure means for continuously monitoring and recording, over a period of time, said differential pressures; and computer means operably connected to said first and second means for continuously monitoring and recording said differential pressures, said computer means being programmed to solve the following equation for determining the distance of said leak from said one end of said pipeline section:

$$DP(-A, t_1)/DP(B, t_1) = \cos h(A)/\cos h(L-A)$$

where $DP(-A, t_1)$ = differential pressure between one end of said pipeline section and its respective standard pressure vessel at time $t_1$, a time later than a selected zero datum time;

$DP(B, t_1)$ = differential pressure between the opposite end of said pipeline section and its respective standard pressure vessel at time $t_1$;

L = the known length of said pipeline section; and

A = the distance between said one end of said pipeline section and the location of said leak.

12. Pipeline leak locating apparatus as set forth in claim 13 including first and second transmitters, respectively, connected to said first and second means for monitoring and recording said differential pressures, and receiver means remotely located with and connected to said computer means to effect simultaneous, real-time input from said first and second differential pressure means for processing by said computer means.

13. Apparatus for locating leaks at an undetermined location in a section of pipeline of known length, the ends of which may be closed, said apparatus comprising:

a first standard pressure vessel of relatively small volume at one end of said pipeline section, a second standard pressure vessel substantially identical to said first standard pressure vessel at the opposite end of said pipeline section;

each of said first and second pressure vessels being in fluid communication with said one and said opposite ends of said pipeline section, respectively, through a first conduit and valve and a second conduit and valve, respectively;

each of said first and second valves being simultaneously closeable to isolate each of said first and second standard vessels from their respective ends of said pipeline section;

first differential pressure measuring means connected to said one end of said pipeline section and said first standard pressure vessel for measuring the differential pressure therebetween;

second differential pressure means connected to said opposite end of said pipeline section and said second standard pressure vessel for measuring the differential pressure therebetween;

first and second means operably and respectively connected to said first and second differential pressure means for continuously monitoring and recording, over a period of time, said differential pressures; and computer means operably connected to said first and second means for continuously monitoring and recording said differential pressures, said computer means being programmed to solve an equation for determining the distance of said leak from said one end of said pipeline section by utilizing said differential pressures.

* * * * *